(12) United States Patent
Jung et al.

(10) Patent No.: US 9,378,585 B2
(45) Date of Patent: Jun. 28, 2016

(54) SYSTEM AND METHOD FOR AUTOMATIC GEOMETRIC CORRECTION USING RPC

(71) Applicant: University of Seoul Industry Cooperation Foundation, Seoul (KR)

(72) Inventors: Hyung Sup Jung, Seoul (KR); Kwan Young Oh, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 0 days.

(21) Appl. No.: 14/523,140

(22) Filed: Oct. 24, 2014

(65) Prior Publication Data

US 2015/0042648 A1 Feb. 12, 2015

Related U.S. Application Data

(63) Continuation of application No. PCT/KR2013/003267, filed on Apr. 18, 2013.

(30) Foreign Application Priority Data

Apr. 25, 2012 (KR) .................. 10-2012-0043031

(51) Int. Cl.
*G06T 17/00* (2006.01)
*G06T 17/05* (2011.01)
(Continued)

(52) U.S. Cl.
CPC .............. *G06T 17/05* (2013.01); *G06K 9/0063* (2013.01); *G06K 9/4604* (2013.01);
(Continued)

(58) Field of Classification Search
None
See application file for complete search history.

(56) References Cited

U.S. PATENT DOCUMENTS

2011/0249860 A1* 10/2011 Chen .................... G06K 9/0063
382/100

FOREIGN PATENT DOCUMENTS

KR 10-0325435 B1 2/2002
KR 10-0413970 B1 1/2004
(Continued)

OTHER PUBLICATIONS

Doo Chun Seo et al., KOMPSAT-2 Direct Sensor Modeling and Geometric Calibration/Validation, The International Archives of the Photogrammetry, Remote Sensing and Spatial Information Sciences. vol. XXXVII. Part B1. Beijing 2008 p. 47-52.*

*Primary Examiner* — Kee M Tung
*Assistant Examiner* — Frank Chen
(74) *Attorney, Agent, or Firm* — Mintz Levin Cohn Ferris Glovsky and Popeo, P.C.; Kongsik Kim; Jonathon Western

(57) ABSTRACT

The present invention relates to a technique for correcting a geometric image error calculated as a rational polynomial coefficient (RPC) only through a corresponding point extracted from a digital elevation model (DEM) and a stereoscopic image without direct measurement of a ground control point (GCP). To this end, a system for automatic geometric correction using an RPC in accordance with the present invention comprises: an auxiliary data extraction unit; a corresponding point extraction unit; a first ground coordinate extraction unit; a second ground coordinate extraction unit; an RPC correction model generation unit; and an image distortion correction unit. The auxiliary data extraction unit extracts two or more different images captured from the same ground surface and auxiliary data of the two or more different images. The corresponding point extraction unit extracts a corresponding point from the two or more different images through image matching. The first ground coordinate extraction unit extracts first ground coordinates from the corresponding point and an RPC model of the auxiliary data. The second ground coordinate extraction unit extracts second ground coordinates by using the first ground coordinates and a correlation coefficient of a DEM. The RPC correction model generation unit generates an RPC correction model by correcting the RPC model on the basis of the second ground coordinates. The image distortion correction unit corrects distortion of an image by allocating ground coordinates to each image coordinates of the image by using the second ground coordinates and the RPC correction model.

7 Claims, 8 Drawing Sheets

(51) Int. Cl.
  *G06T 5/00* (2006.01)
  *G06T 3/00* (2006.01)
  *H04N 13/00* (2006.01)
  *G06K 9/46* (2006.01)
  *G06K 9/62* (2006.01)
  *G06K 9/00* (2006.01)

(52) U.S. Cl.
  CPC ........... *G06K 9/6201* (2013.01); *G06T 3/0081* (2013.01); *G06T 5/002* (2013.01); *G06T 5/006* (2013.01); *H04N 13/0007* (2013.01)

(56) References Cited

FOREIGN PATENT DOCUMENTS

| | | |
|---|---|---|
| KR | 10-0473958 B1 | 2/2005 |
| KR | 10-0473959 B1 | 2/2005 |
| KR | 10-0501071 B1 | 7/2005 |
| KR | 10-0520275 B1 | 10/2005 |
| KR | 10-0762891 B1 | 10/2007 |
| KR | 10-0870894 B1 | 11/2008 |
| KR | 10-0904078 B1 | 6/2009 |

* cited by examiner

SYSTEM AND METHOD FOR AUTOMATIC GEOMETRIC CORRECTION USING RPC

CROSS-REFERENCE TO RELATED APPLICATION

This is a continuation of International Application No. PCT/KR2013/003267 filed on Apr. 18, 2013, which claims priority to Korean Application No. 10-2012-0043031 filed on Apr. 25, 2012. The applications are incorporated herein by reference.

TECHNICAL FIELD

The present invention relates, in general, to a system and method for automatic geometric correction using RPCs and, more particularly, to technology for correcting an RPC model determined from the statues of satellites, locations and camera information, when satellite images were photographed, using ground control points automatically extracted from a digital elevation model, thereby allocating accurate ground coordinates to each set of image coordinates of the images.

The present invention was contrived based on research that was conducted as part of the General Researcher Support Project sponsored by the Korean Ministry of Education, Science and Technology and the National Research Foundation of Korea [Project management number: 2011-0003569; Project title: Development of Technology for 3D Location Determination of Pushbroom Sensor].

BACKGROUND ART

In the case of linear scanning images, an observation location and speed, an observation posture and an observation angle given as auxiliary data are generally inaccurate. Accordingly, when the geometry of the linear scanning images is recovered using the auxiliary data, geometric distortion occurs, with the result that accurate locations cannot be determined from the images. In particular, in the case of satellite images, the situation is more serious. In order to correct the geometric distortion of linear scanning images, ground control points (GCPs), to which ground points corresponding to image points have been allocated, are used. Geometry is recovered using a few or more ground control points, and then ground coordinates are allocated to images based on the recovered geometry, thereby allocating accurate ground locations to the images.

In general, ground control points are acquired directly through actual measurement using GPS equipment. However, because of a constraint condition requiring a visit to an actual place, considerable time and cost are required, and actual measurement itself cannot be performed in an inaccessible place, such as North Korea. For this reason, a variety of types of research into a method of reducing the number of ground control points and the replacement of ground control points have been conducted.

One of the methods is a method of reducing the number of ground control points by adjusting only the photographing angle (LOS vector) of the sensor of photographing equipment. However, the use of a small number of ground control points is problematic in that an error in the selection of image points in images and distortion attributable to the location error of ground points may occur and also the above method cannot be used in an area in which ground control points cannot be obtained.

Therefore, Korean Patent No. 10-0870894 describes a method for automatic geometric correction of linear pushbroom images, which is capable of automatically extracting ground control points using digital elevation data provided by a digital elevation model, allocating accurate ground coordinates to each set of image coordinates of images, reducing the time and cost required for geometric correction, and improving the accuracy of ground coordinates.

However, most high-resolution satellite images provide data including RPCs to enable 3D location determination in a target area. Since image geometry calculated as RPCs includes a specific number of systematic errors, technology for correcting the systematic errors and then allocating accurate ground coordinates to each set of image coordinates of images is required.

Meanwhile, research that has been conducted so far is disadvantageous in that data clips requiring high costs in an early stage, such as geometrically corrected satellite images, Synthetic Aperture Radar (SAR) images, Light Detection And Ranging (LIDAR) data, a Ground Control Point (GCP) chip, a digital map, etc., are prerequisites, manual work is partially required to make the coordinate systems of images uniform when multi-sensor data, such as SAR images, is used, and a processing process is relatively very complicated. Furthermore, the accuracy of performed final geometric correction is also unsatisfactory.

SUMMARY OF THE DISCLOSURE

An object of the present invention is to overcome a technical limitation in which the geometry of images calculated using RPCs can be accurately corrected only when a few or more ground control points are given, thereby minimizing physical and human resources required for the acquisition of ground control points and also enabling the accurate 3D location information of even an inaccessible area to be acquired.

Another object of the present invention is to provide technology that can automatically extract ground control points using a digital elevation model (DEM), thereby reducing the time and costs required for a geometric correction process and also improving the accuracy of sensor modeling that allocates ground coordinates to each set of image coordinates of images.

In order to achieve the above objects, a system for automatic geometric correction using RPCs in accordance with the present invention includes an auxiliary data extraction unit, a tie point extraction unit, a first ground coordinates extraction unit, a second ground coordinates extraction unit, an RPC correction model generation unit, and an image distortion correction unit. The auxiliary data extraction unit extracts two or more different images, acquired by photographing a same ground surface, and auxiliary data on the images. The tie point extraction unit extracts a tie point from the two or more different images through image matching. The first ground coordinates extraction unit extracts first ground coordinates from the tie point and the RPC (rational polynomial coefficient) model of the auxiliary data. The second ground coordinates extraction unit extracts second ground coordinates using the first ground coordinates and the correlation coefficients of a digital elevation model. The RPC correction model generation unit generates an RPC correction model by correcting the RPC model based on the second ground coordinates. The image distortion correction unit corrects the distortion of the images by allocating ground coordinates to each set of image coordinates of the images using the second ground coordinates and the RPC correction model.

As described above, in accordance with the technology for automatic geometric correction using RPCs, the advantages of being able to automatically extract ground control points from a digital elevation model and then allocate accurate ground coordinates to each set of image coordinates of images, significantly reduce the costs and time required for image geometric correction, increase the accuracy of extracted ground coordinates, simplify the processes of generating an orthoimage, an image map, a digital map and a digital elevation model, and reduce task time are achieved.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

In order to achieve the above objects, a system for automatic geometric correction using RPCs in accordance with the present invention includes an auxiliary data extraction unit, a tie point extraction unit, a first ground coordinates extraction unit, a second ground coordinates extraction unit, an RPC correction model generation unit, and an image distortion correction unit. The auxiliary data extraction unit extracts two or more different images, acquired by photographing a same ground surface, and auxiliary data on the images. The tie point extraction unit extracts a tie point from the two or more different images through image matching. The first ground coordinates extraction unit extracts first ground coordinates from the tie point and the RPC (rational polynomial coefficient) model of the auxiliary data. The second ground coordinates extraction unit extracts second ground coordinates using the first ground coordinates and the correlation coefficients of a digital elevation model. The RPC correction model generation unit generates an RPC correction model by correcting the RPC model based on the second ground coordinates. The image distortion correction unit corrects the distortion of the images by allocating ground coordinates to each set of image coordinates of the images using the second ground coordinates and the RPC correction model.

Hereinafter, preferred embodiments of the present invention will be described in detail with reference to the accompanying drawings. In the following description of the present invention, detailed descriptions of well-known configuration or functions are omitted if it is determined that they may unnecessarily make the gist of the present invention obscure. Furthermore, in the descriptions of the embodiments of the present invention, specific numerical values correspond merely to embodiments, and exaggerated numerical values different from actual values may be presented for ease of description and understanding.

<Description of System>

Figure 1:
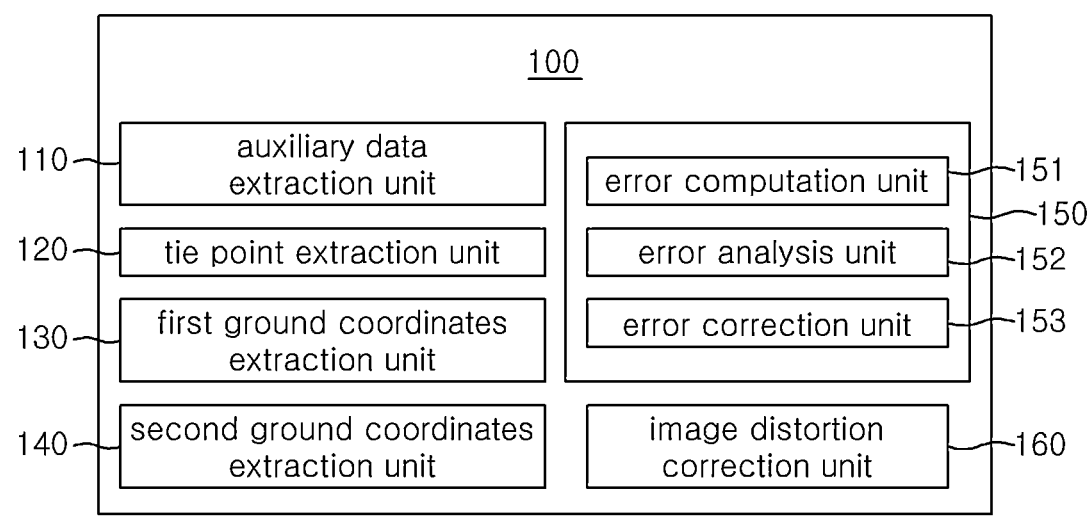
FIG. 1 is a diagram illustrating the schematic configuration of a system for automatic geometric correction using RPCs in accordance with the present invention.

FIG. 1 is a diagram illustrating the schematic configuration of a system for automatic geometric correction using RPCs in accordance with the present invention.

Referring to FIG. 1, a system 100 for automatic geometric correction using RPCs in accordance with the present invention includes an auxiliary data extraction unit 110, a tie point extraction unit 120, a first ground coordinates extraction unit 130, a second ground coordinates extraction unit 140, an RPC correction model generation unit 150, and an image distortion correction unit 160.

The auxiliary data extraction unit 110 extracts two or more different images acquired by photographing the same ground surface and auxiliary data (for example, RPC data) on these images.

The tie point extraction unit 120 extracts a tie point from the two or more different image through image matching. In this case, the extraction of the tie point requires the process of calculating correlation coefficients for the different images and then finding a location having the highest correlation coefficient. This tie point extraction process is a process that is generally used in the field of numerical photogrammetry and that is well known to those skilled in the art.

The first ground coordinates extraction unit 130 extracts first ground coordinates $(P_x^1, P_y^1, P_z^1)$ from the tie point and the rational polynomial coefficient (RPC) model of the auxiliary data. The extraction of the first ground coordinates is performed using the RPC data and the RPC model that are provided along with the satellite images. The RPC model that is provided along with the satellite images is a relation that is used to perform transformation between ground coordinates $(P_x, P_y, P_z)$ and image coordinates $(i,j)$. Furthermore, the RPC model may be divided into main transformation equations and inverse transformation equations. The main transformation equations are fractional expressions that are used to obtain the image coordinates $(i,j)$ by using the ground coordinates $(P_x, P_y, P_z)$ as input values, and the denominators and numerators thereof are composed of third-order polynomials.

The main transformation equations are expressed as the following Equations 1, 2 and 3:

$$r_n = \frac{p1(X_n, Y_n, Z_n)}{p2(X_n, Y_n, Z_n)}, \quad (1)$$

$$c_n = \frac{p3(X_n, Y_n, Z_n)}{p4(X_n, Y_n, Z_n)}$$

$$r_n = \frac{p1(X_n, Y_n, Z_n)}{p2(X_n, Y_n, Z_n)} \quad (2)$$

$$= \frac{\sum_{i=0}^{m1}\sum_{j=0}^{m2}\sum_{k=0}^{m3} a_{ijk} X^i Y^j Z^k}{\sum_{i=0}^{n1}\sum_{j=0}^{n2}\sum_{k=0}^{n3} b_{ijk} X^i Y^j Z^k}$$

$$c_n = \frac{p3(X_n, Y_n, Z_n)}{p4(X_n, Y_n, Z_n)}$$

$$= \frac{\sum_{i=0}^{m1}\sum_{j=0}^{m2}\sum_{k=0}^{m3} c_{ijk} X^i Y^j Z^k}{\sum_{i=0}^{n1}\sum_{j=0}^{n2}\sum_{k=0}^{n3} d_{ijk} X^i Y^j Z^k}$$

$$p1(X_n, Y_n, Z_n) = a_0 + a_1 X + a_2 Y + a_3 Z + a_4 X^2 + a_5 XY + a_6 XZ + \quad (3)$$
$$a_7 Y^2 + a_8 YZ + a_9 Z^2 + a_{10} X^3 + a_{11} X^2 Y + a_{12} X^2 Z + a_{12} XY^2 +$$
$$a_{14} XYZ + a_{15} XZ^2 + a_{16} Y^3 + a_{17} Y^2 Z + a_{18} YZ^2 + a_{19} Z^3 3$$

The denominators and numerators of Equation 1 are third-order polynomials and are expressed as Equation 2, and pi $(X_n, Y_n, Z_n)$ (i=1, 2, 3, 4) has differences only in the coefficient value and has the same equation form. Equation 3 expresses p1$(X_n, Y_n, Z_n)$ as a polynomial. Furthermore, $a_{ijk}, b_{ijk}, c_{ijk}, d_{ijk}$ of Equation 2 are the coefficients of the polynomial expressed in Equation 3, and represent RPC data.

In order to obtain ground coordinates using an RPC model, the main transformation equations should be transformed into the inverse transformation equations.

The inverse transformation equations are expressed by the following Equations 4 and 5:

$$Vr_L = r_L 0 + \frac{\partial r_L}{\partial X}\Delta X + \frac{\partial r_L}{\partial Y}\Delta Y + \frac{\partial r_L}{\partial Z}\Delta Z - r_L \qquad (4)$$

$$Vc_L = c_L 0 + \frac{\partial c_L}{\partial X}\Delta X + \frac{\partial c_L}{\partial Y}\Delta Y + \frac{\partial c_L}{\partial Z}\Delta Z - c_L$$

$$Vr_R = r_R 0 + \frac{\partial r_R}{\partial X}\Delta X + \frac{\partial r_R}{\partial Y}\Delta Y + \frac{\partial r_R}{\partial Z}\Delta Z - r_R$$

$$Vc_R = c_R 0 + \frac{\partial c_R}{\partial X}\Delta X + \frac{\partial c_R}{\partial Y}\Delta Y + \frac{\partial c_R}{\partial Z}\Delta Z - c_R$$

$$\begin{vmatrix} Vr_L \\ Vc_L \\ Vr_R \\ Vc_R \end{vmatrix} - \begin{vmatrix} \frac{\partial r_L}{\partial X} & \frac{\partial r_L}{\partial Y} & \frac{\partial r_L}{\partial X} \\ \frac{\partial c_L}{\partial X} & \frac{\partial c_L}{\partial Y} & \frac{\partial c_L}{\partial Y} \\ \frac{\partial r_R}{\partial X} & \frac{\partial r_R}{\partial Y} & \frac{\partial r_R}{\partial Y} \\ \frac{\partial c_R}{\partial X} & \frac{\partial c_R}{\partial Y} & \frac{\partial c_R}{\partial Y} \end{vmatrix} \begin{vmatrix} \Delta X \\ \Delta Y \\ \Delta Z \end{vmatrix} = \begin{vmatrix} r_L 0 - r_L \\ c_L 0 - c_L \\ r_R 0 - r_R \\ c_R 0 - c_R \end{vmatrix} \qquad (5)$$

Equation 4 is obtained by transforming Equation 1 using a linearization method based on Taylor series expansion and then rewriting the results of the transformation in the form of observation equations. Furthermore, Equation 4 is rewritten in the form of a matrix, as shown in Equation 5, and 3D ground coordinates $(P_x, P_y, P_z)$ are determined through iterative calculations using a least square method. In this case, $Vr_L, Vc_L, Vr_R, Vc_R$ are residuals, $r_L 0, c_L 0, r_R 0, c_R 0$ are initial image coordinates, and $r_L, c_L, r_R, c_R$ are actual image coordinates in a stereoscopic image. This process corresponds to a method that is generally used in the field of numerical photogrammetry.

The first ground coordinates $(P_x^1, P_y^1, P_z^1)$ determined through the above-described process have an error due to incomplete RPC data. Even when the differences between the first ground coordinates $(P_x^1, P_y^1, P_z^1)$ and the original ground coordinates $(P_x, P_y, P_z)$ are large, these errors exhibit constant differences at a tie point.

The second ground coordinates extraction unit 140 extracts second ground coordinates $(P_x^2, P_y^2, P_z^2)$ using the first ground coordinates and the correlation coefficients of a digital elevation model. In this case, the extraction is performed based on the fact that even when the differences between the first ground coordinates and the original ground coordinates are large, the differences are constant. A method of extracting the second ground coordinates may be performed using a method of extracting second ground coordinates using a correlation coefficient map between first ground coordinates and a digital elevation model disclosed in Korean Patent No. 10-0870894 entitled "Method of Automatic Geometric Correction for Linear Pushbroom Image."

An equation for correlation coefficient ρ used to generate the correlation coefficient map may be defined as the following Equation 6:

$$\rho = \frac{\sum_{i=1}^{N}[Z_i - \mu][Z_{DEMi} - \mu_{DEM}]}{\sqrt{\sum_{i=1}^{N}[Z_i - \mu]^2 \cdot \sum_{i=1}^{N}[Z_{DEMi} - \mu_{DEM}]^2}} \qquad (6)$$

In the above equation, ρ is defined as the correlation coefficient, $Z_i$ and μ are defined as altitudes calculated for the extracted tie points using an RPC model and the average value thereof, respectively, $Z_{DEMi}$ and $\mu_{DEM}$ are defined as altitudes extracted from a digital elevation model and the average value thereof, respectively, and N is defined as the number of all tie points.

In the present invention, in the case of ground coordinates extracted using an RPC model, the ground coordinates are provided in the form of WGS 84-based longitude and latitude coordinates. When SRTM DEM is used as an embodiment of the present invention, a corresponding digital elevation model is given in the form of an earth gravitational model 1996 (EGM 96) geoid-based longitude and latitude coordinates, and thus the digital elevation model should be transformed into WGS 84-based longitude and latitude coordinates.

Meanwhile, the RPC correction model generation unit 150 generates an RPC correction model by correcting the RPC model based on the second ground coordinates. For this purpose, the RPC correction model generation unit 150 includes an error computation unit 151, an error analysis unit 152, and an error correction unit 153.

The error computation unit 151 calculates an error in an X direction and an error in a Y direction between the first ground coordinates and the second ground coordinates.

The error analysis unit 152 analyzes error tendencies in an image column direction and an image line direction with respect to the calculated errors in the X and Y directions.

The error correction unit 153 corrects the errors in the X and Y directions based on the results of the analysis.

In this case, when images acquired by photographing a ground surface are KOMPSAT-2 stereoscopic images in the present invention, the error correction unit 153 generates the RPC correction model by correcting the error in the X direction in the image line direction and the error in the Y direction in the image column direction based on the results of the analysis of the error tendency of the stereoscopic images, which may be expressed as the following Equation 7:

$$\Delta_x = \alpha_0 l + \beta_0 \Delta_y = \alpha_1 c + \beta_1 \qquad (7)$$

In this equation, $\Delta_x$ and $\Delta_y$ are the errors in the X and Y directions calculated by the RPC model, c and i are the numbers of columns and lines in the images, and $\alpha_0, \alpha_1, \beta_0, \beta_1$ are RPC bias correction factors.

The image distortion correction unit 160 corrects the distortion of the images by allocating ground coordinates to each set of image coordinates of the images by using the second ground coordinates and the RPC correction model. That is, the image distortion correction unit 160 performs exterior orientation that allocates accurate ground coordinates to each set of image coordinates of the images in such a manner as to correct the errors of the RPC model using the second ground coordinates and the RPC correction model.

In accordance with this configuration, the advantage of being able to perform automatic image geometric correction using only a tie point between stereoscopic images and a digital elevation model without requiring a ground control point can be achieved.

<Description of Method>

Figure 2:
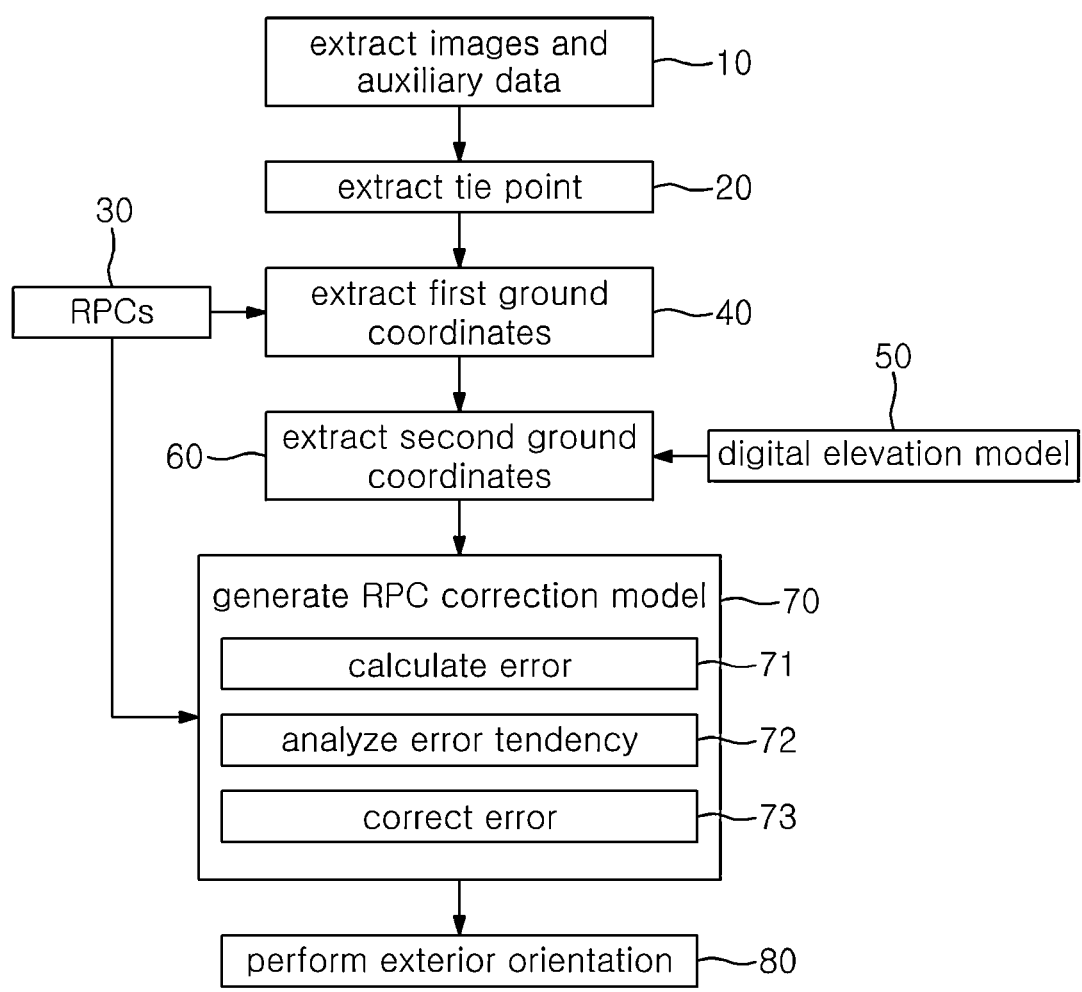
FIG. 2 is a flowchart illustrating the flow of a method for automatic geometric correction using RPCs in accordance with the present invention.

FIG. 2 is a flowchart illustrating the process of the performance of a method for automatic geometric correction using RPCs in accordance with the present invention.

stereoscopic images acquired by photographing a ground surface and RPC data provided along with these images are extracted at step 10, a tie point is extracted from these images through image matching at step 20, first ground coordinates $(P_x^1, P_y^1, P_z^1)$ are extracted from the tie point and RPC data 30 at step 40, and second ground coordinates $(P_x^2, P_y^2, P_z^2)$ are extracted using correlation coefficients between the first ground coordinates and a digital elevation model 50 at step 60. Thereafter, an RPC correction model is generated using the second ground coordinates and the RPC data 30 at step 70, and exterior orientation for correcting the distortion of the images is performed by allocating accurate ground coordinates to each set of image coordinates of the images using the second ground coordinates and the RPC correction model at step 80.

The individual steps are described in detail below with reference to the accompanying drawings.

At the image and auxiliary data extraction step 10, stereoscopic images acquired by photographing the same area are extracted, and RPC data on each of the images is extracted.

In this case, the stereoscopic images are a pair of images that enable the same area to be viewed using a super-stereoscopic vision effect, and the RPC data is the coefficients of an RPC model that are composed of fractional polynomials extracted from a physical sensor model determined from information about the postures of satellites, the photographing time for each center line of the images, the photographing time for each line of the images, photographing angles, etc when the images were photographed. In order to perform automatic geometric correction in accordance with the present invention, two or more images acquired by photographing the same area and RPC data on these images should be extracted.

The tie point extraction step 20 is the step of finding the corresponding same point in the input images. In this case, the tie point is a point that is representative of the same location in the different images. The extraction of the tie point requires the process of calculating correlation coefficients for the different images and then finding a location having the highest correlation coefficient. This tie point extraction process is a process that is generally used in the field of numerical photogrammetry and that is well known to those skilled in the art.

The first ground coordinate extraction step 40 is the step of extracting first ground coordinates $(P_x^1, P_y^1, P_z^1)$ from the RPC data extracted above and the tie point extracted at the tie point extraction step 20. The extraction of the first ground coordinates is performed using the RPC data and the RPC model that are provided along with the satellite images. The RPC model that is provided along with the satellite images is a relation that is used to perform transformation between ground coordinates $(P_x, P_y, P_z)$ and image coordinates $(i,j)$. Furthermore, the RPC model may be divided into main transformation equations and inverse transformation equations. The main transformation equations are fractional expressions that are used to obtain the image coordinates $(i,j)$ by using the ground coordinates $(P_x, P_y, P_z)$ as input values, and the denominators and numerators thereof are composed of third-order polynomials.

The main transformation equations are expressed as the following Equations 1, 2 and 3:

$$r_n = \frac{p1(X_n, Y_n, Z_n)}{p2(X_n, Y_n, Z_n)}, \quad (1)$$

$$c_n = \frac{p3(X_n, Y_n, Z_n)}{p4(X_n, Y_n, Z_n)}$$

$$r_n = \frac{p1(X_n, Y_n, Z_n)}{p2(X_n, Y_n, Z_n)} \quad (2)$$

$$= \frac{\sum_{i=0}^{m1}\sum_{j=0}^{m2}\sum_{k=0}^{m3} a_{ijk} X^i Y^j Z^k}{\sum_{i=0}^{n1}\sum_{j=0}^{n2}\sum_{k=0}^{n3} b_{ijk} X^i Y^j Z^k}$$

$$c_n = \frac{p3(X_n, Y_n, Z_n)}{p4(X_n, Y_n, Z_n)}$$

$$= \frac{\sum_{i=0}^{m1}\sum_{j=0}^{m2}\sum_{k=0}^{m3} c_{ijk} X^i Y^j Z^k}{\sum_{i=0}^{n1}\sum_{j=0}^{n2}\sum_{k=0}^{n3} d_{ijk} X^i Y^j Z^k}$$

$$p1(X_n, Y_n, Z_n) = a_0 + a_1 X + a_2 Y + a_3 Z + a_4 X^2 + a_5 XY + a_6 XZ + \quad (3)$$
$$a_7 Y^2 + a_8 YZ + a_9 Z^2 + a_{10} X^3 + a_{11} X^2 Y + a_{12} X^2 Z + a_{12} XY^2 +$$
$$a_{14} XYZ + a_{15} XZ^2 + a_{16} Y^3 + a_{17} Y^2 Z + a_{18} YZ^2 + a_{19} Z^3 3$$

The denominators and numerators of Equation 1 are third-order polynomials and expressed as Equation 2, and $pi(X_n, Y_n, Z_n)(i=1, 2, 3, 4)$ has differences only in the coefficient value and has the same equation form. Equation 3 expresses $p1(X_n, Y_n, Z_n)$ as a polynomial. Furthermore, $a_{ijk}, b_{ijk}, c_{ijk}, d_{ijk}$ of Equation 2 are the coefficients of the polynomial expressed in Equation 3, and represent RPC data.

In order to obtain ground coordinates using an RPC model, the main transformation equations should be transformed into the inverse transformation equations.

The inverse transformation equations are expressed by the following Equations 4 and 5:

$$Vr_L = r_L 0 + \frac{\partial r_L}{\partial X}\Delta X + \frac{\partial r_L}{\partial Y}\Delta Y + \frac{\partial r_L}{\partial Z}\Delta Z - r_L \quad (4)$$

$$Vc_L = r_L 0 + \frac{\partial c_L}{\partial X}\Delta X + \frac{\partial c_L}{\partial Y}\Delta Y + \frac{\partial c_L}{\partial Z}\Delta Z - c_L$$

$$Vr_R = r_R 0 + \frac{\partial r_R}{\partial X}\Delta X + \frac{\partial r_R}{\partial Y}\Delta Y + \frac{\partial r_R}{\partial Z}\Delta Z - r_R$$

$$Vc_R = c_R 0 + \frac{\partial c_R}{\partial X}\Delta X + \frac{\partial c_R}{\partial Y}\Delta Y + \frac{\partial c_R}{\partial Z}\Delta Z - c_R$$

$$\begin{vmatrix} Vr_L \\ Vc_L \\ Vr_R \\ Vc_R \end{vmatrix} - \begin{vmatrix} \frac{\partial r_L}{\partial X} & \frac{\partial r_L}{\partial Y} & \frac{\partial r_L}{\partial X} \\ \frac{\partial c_L}{\partial X} & \frac{\partial c_L}{\partial Y} & \frac{\partial c_L}{\partial X} \\ \frac{\partial r_R}{\partial X} & \frac{\partial r_R}{\partial Y} & \frac{\partial r_R}{\partial Y} \\ \frac{\partial c_R}{\partial X} & \frac{\partial c_R}{\partial Y} & \frac{\partial c_R}{\partial Y} \end{vmatrix} \begin{vmatrix} \Delta X \\ \Delta Y \\ \Delta Z \end{vmatrix} = \begin{vmatrix} r_L 0 - r_L \\ c_L 0 - c_L \\ r_R 0 - r_R \\ r_R 0 - c_R \end{vmatrix} \quad (5)$$

Equation 4 is obtained by transforming Equation 1 using a linearization method based on Taylor series expansion and then rewriting the results of the transformation in the form of observation equations. Furthermore, Equation 4 is rewritten in the form of a matrix, as shown in Equation 5, and 3D ground coordinates $(P_x, P_y, P_z)$ are determined through iterative calculations using a least square method. In this case, $Vr_L, Vc_L, Vr_R, Vc_R$ are residuals, $r_L 0, c_L 0, r_R 0, c_R 0$ are initial image coordinates, and $r_L, c_L, r_R, c_R$ are actual image coordinates in a stereoscopic image. This process corresponds to a method that is generally used in the field of numerical photogrammetry.

The first ground coordinates $(P_x^1, P_y^1, P_z^1)$ determined through the above-described process have an error due to incomplete RPC data. Even when the differences between the first ground coordinates $(P_x^1, P_y^1, P_z^1)$ and the original ground coordinates $(P_x, P_y, P_z)$ are large, these errors exhibit constant differences at a tie point.

Figure 3:
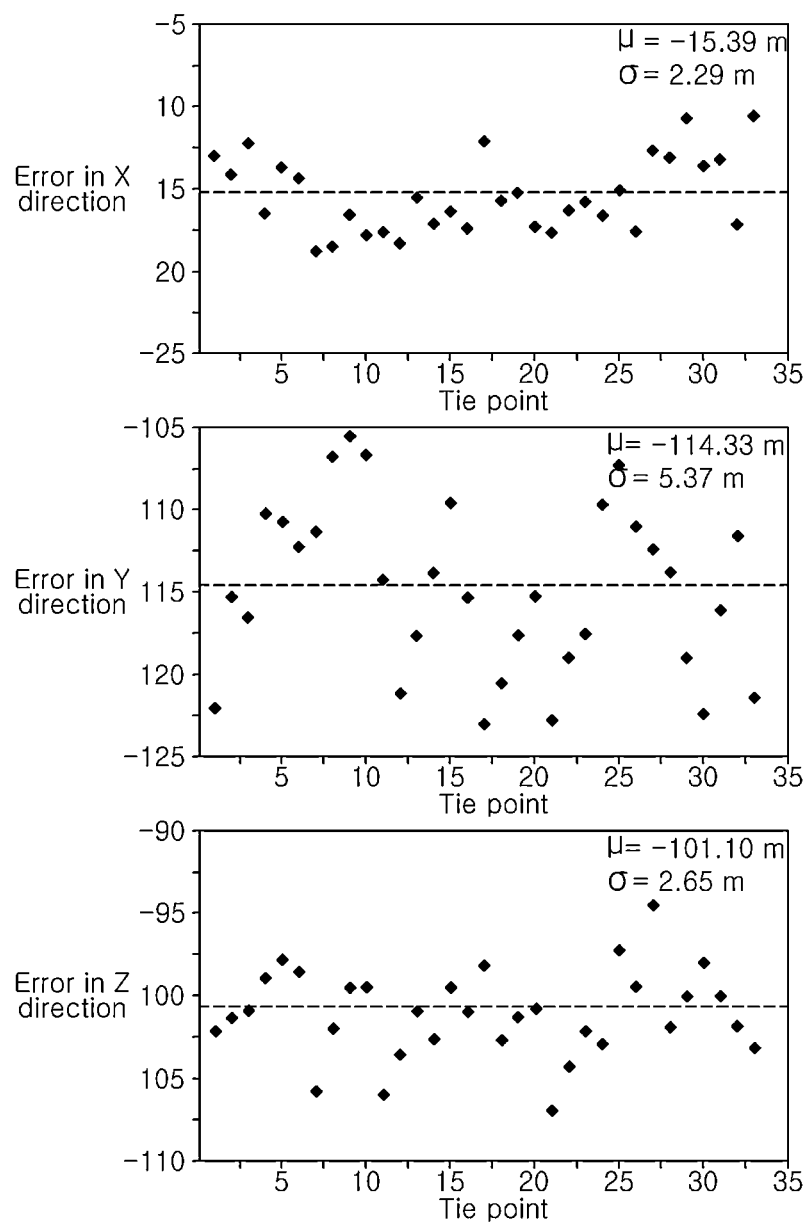
FIG. 3 is a diagram illustrating errors in first ground coordinates calculated for 33 test points using KOMPSAT-2 stereoscopic images and an RPC model.

FIG. 3 is a graph illustrating errors in first ground coordinates calculated via 33 tie points in stereoscopic images using KOMPSAT-2 stereoscopic images and an RPC model in an embodiment of the present invention. The results indicate that the first ground coordinates have very large values of −15.39 m, −114.33 m and −101.10 m in X, Y and Z directions, respectively, and the standard deviations exhibit almost constant differences of 2.29 m, 5.37 m and 2.65 m. From this, it can be seen that the first ground coordinates exhibit constant differences from original ground coordinates.

The second ground coordinates extraction step 60 is the step of obtaining a correlation coefficient map between the determined first ground coordinates and a previously generated digital elevation model and extracting second ground coordinates $(P_x^2, P_y^2, P_z^2)$. The present step is performed based on the fact that even when the differences between the first ground coordinates and the original ground coordinates are large, the differences are constant. A method of extracting the second ground coordinates is performed using a method of extracting second ground coordinates using a correlation coefficient map between first ground coordinates and a digital elevation model disclosed in Korean Patent Application No. 10-2007-0054328 entitled "Method of Automatic Geometric Correction for Linear Pushbroom Image."

An equation for correlation coefficient ρ used to generate the correlation coefficient map may be defined as the following Equation 6:

$$\rho = \frac{\sum_{i=1}^{N} [Z_i - \mu][Z_{DEMi} - \mu_{DEM}]}{\sqrt{\sum_{i=1}^{N} [Z_i - \mu]^2 \cdot \sum_{i=1}^{N} [Z_{DEMi} - \mu_{DEM}]^2}} \quad (6)$$

In the above equation, ρ is defined as the correlation coefficient, $Z_i$ and μ are defined as altitudes calculated for the extracted tie points using an RPC model and the average value thereof, respectively, $Z_{DEMi}$ and $\mu_{DEM}$ are defined as altitudes extracted from a digital elevation model and the average value thereof, respectively, and N is defined as the number of all tie points.

A method of extracting second ground coordinates will be described with reference to the accompanying drawings.

Figure 4:
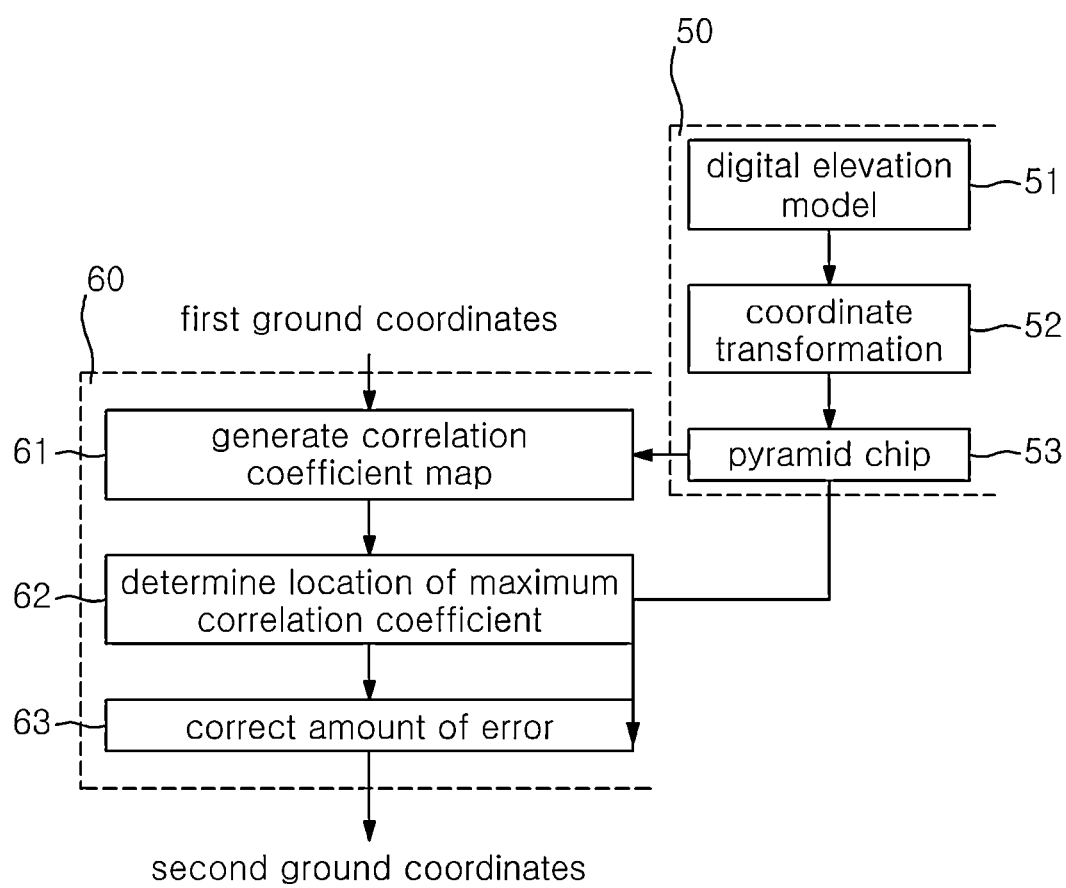
FIG. 4 is a diagram illustrating the flow of a method of extracting second ground coordinates in accordance with the present invention.

FIG. 4 is a diagram illustrating the flow of the procedure of a method of extracting second ground coordinates in accordance with the present invention.

A model that is provided by any one of altitude data extracted using RTM DEM, GTOPO-30, and TIN cells and LIDAR data may be used as a digital elevation model 51 that is used for the generation of the correlation coefficient map.

A coordinate transformation step 52 is the step of transforming the digital elevation model into a coordinate system that the extracted first ground coordinates have. In the case of ground coordinates extracted using an RPC model, the ground coordinates are provided in the form of WGS 84-based longitude and latitude coordinates. When SRTM DEM is used as an embodiment of the present invention, a corresponding digital elevation model is given in the form of an earth gravitational model 1996 (EGM 96) geoid-based longitude and latitude coordinates, the digital elevation model should be transformed into WGS 84-based longitude and latitude coordinates.

A pyramid chip 53 includes a digital elevation model interpolated based on the resolution of a search area size, a search interval and a search interval size required for the process of generating the correlation coefficient map.

When KOMPSAT-2 images are used as an embodiment of the present invention, 3-level pyramid chips are applied based on an experimental method, the search areas of the respective levels are determined to be 500×500 m, 30×30 m and 15×15 m, and search intervals are determined to be 5 m, 1 m and 0.5 m. Furthermore, this case is characterized in that the resolutions of digital elevation models used for the respective levels follow the set search intervals and the digital elevation models for the respective levels are generated using spline interpolation.

A correlation coefficient map generation step 61 is the step of calculating correlation coefficients from the altitude values of the first ground coordinates and the altitude values of the digital elevation model transformed into the coordinate system of the ground coordinates and then generating a correlation coefficient map.

The first ground coordinates $(P_x^1, P_y^1, P_z^1)$ extracted at the first ground coordinates extraction step 40 have constant differences from the original ground coordinates $(P_x, P_y, P_z)$. Therefore, the first ground coordinates constant errors ΔX,ΔY,ΔZ from the digital elevation model in X (longitude), Y (latitude direction) and Z (altitude) directions. An altitude corresponding to the horizontal coordinates $(P_x^1, P_y^1)$ of the transformed first ground coordinates is extracted from a digital elevation model. If the horizontal coordinates are different from the horizontal coordinates of original ground coordinates, the difference between the altitude extracted from the digital elevation model and the altitude of the initially calculated 3D ground coordinates will not be constant at each tie point. The reason for this is that since the altitude is extracted at a location, other than the horizontal coordinates of the original ground coordinates, the two altitude values have different values, and thus constant errors are not generated at all tie points. However, if coordinates $(X_i+\Delta X, Y_i+\Delta Y)$ obtained by adding constant errors to the horizontal coordinates of calculated 3D ground coordinates correspond to the same location as original ground coordinates and the altitude of the digital elevation model is extracted at the location, this altitude will have a constant error from the altitude of initially calculated 3D ground coordinates. In this case, having a constant error means that $Z_{DEMi}(n,m)$ and $Z_i$ exhibit almost the same difference with respect to most tie points, which means that correlation coefficients are high.

Horizontal coordinates $(X_i+\Delta X(n,m), Y_i+\Delta Y(n,m))$ for search areas for respective levels determined at the pyramid chip step 53 are calculated with respect to all tie points. An altitude corresponding to the horizontal coordinates is extracted from a digital elevation model, and a correlation coefficient map between the altitude $Z_{DEMi}(n,m)$ extracted from the digital elevation model and the altitude $Z_i$ of the initially calculated 3D ground coordinates is generated. The maximum value is determined in the correlation coefficient map, and an X-direction error ΔX and a Y-direction error ΔY are determined in the X and Y directions from a location having a maximum correlation coefficient. Furthermore, the difference between $Z_{DEMi}(n,m)$ and $Z_i$ is calculated from the determined horizontal coordinates and then an altitude error $\Delta Z$ is determined, and correction is performed by adding $(\Delta X, \Delta Y, \Delta Z)$ to the initially determined 3D ground coordinates.

A correlation coefficient map is generated based on the search area and interval for each level determined at the step of the pyramid chip 53. Horizontal coordinates obtained by adding errors to the horizontal coordinates of the first ground coordinates are calculated with respect to all tie points extracted at the tie point extraction step 20, and then the correlation coefficients of the altitude $Z_{DEMi}(n,m)$ extracted from a digital elevation model for each level pyramid chip and the altitude $P_z^1$ of the first ground coordinates are generated using an altitude corresponding to the horizontal coordinates. These correlation coefficients are calculated based on the search area and interval for each level pyramid chip in the X and Y directions, thereby calculating a 2D correlation coefficient map.

Figure 5:
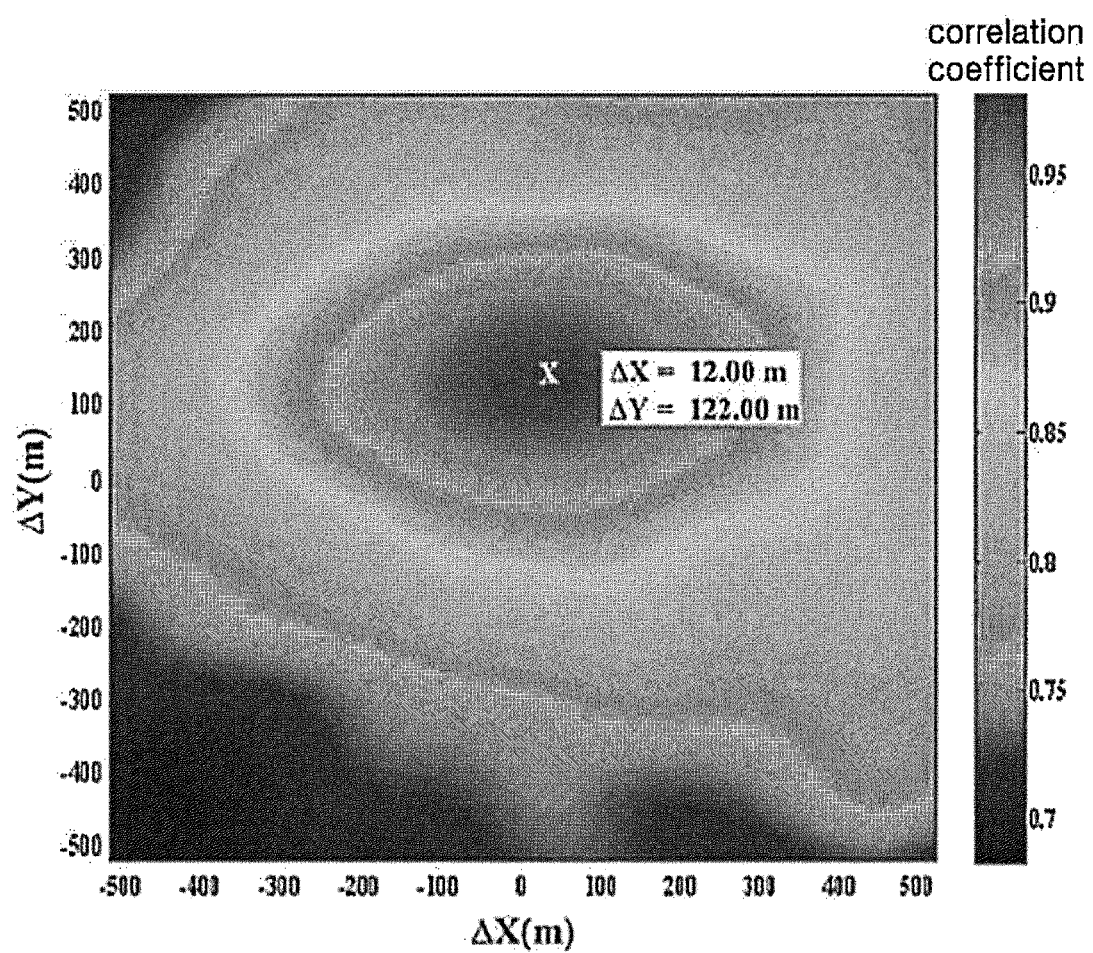
FIG. 5 is a graph illustrating an example of a correlation coefficient map calculated using KOMPSAT-2 stereoscopic images and RPCs.

FIG. 5 illustrates an embodiment of a correlation coefficient map calculated using KOMPSAT-2 stereoscopic images and RPCs, which was generated using the extracted first ground coordinates and the first level pyramid chip determined at the pyramid chip step 53. As can be seen from the drawing, an error $\Delta X$ in an X direction and an error $\Delta Y$ in a Y direction determined from the maximum value location of the correlation coefficient map generated using the extracted first ground coordinates and the first level pyramid chip were 12 m and 122 m, respectively.

A maximum correlation coefficient location determination step 62 determines the maximum value location of the correlation coefficient map generated using the extracted first ground coordinates and the level-based pyramid chips, and determines an error in an X direction and an error in a Y direction. An altitude error $\Delta Z$ is determined from horizontal coordinates $(X_i+\Delta X(n,m), Y_i+\Delta Y(n,m))$, determined as described above, using the altitude extracted from the digital elevation model and the altitude $P_z^1$ of the first ground coordinates.

Figure 6:
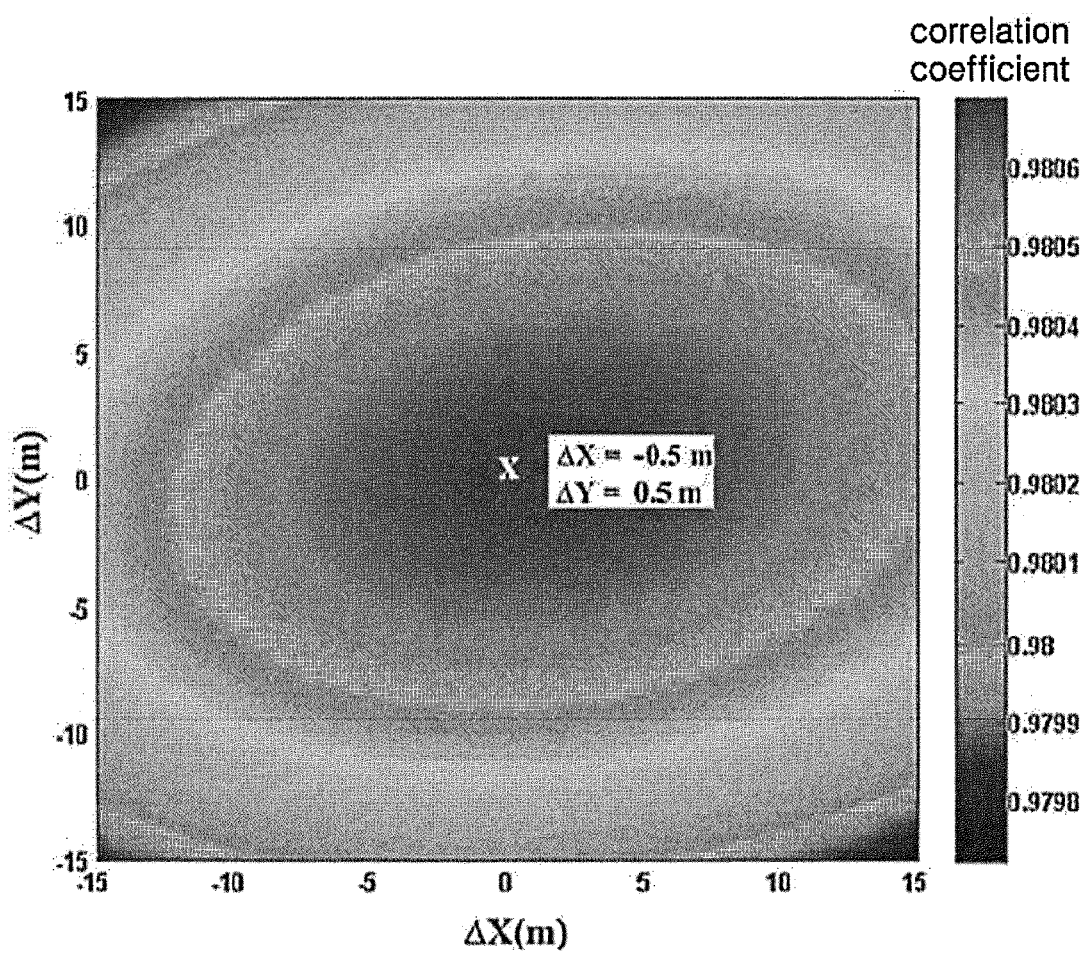
FIG. 6 is a graph illustrating an example in which a location having the maximum value is has been interpolated into a correlation coefficient map calculated using KOMPSAT-2 stereoscopic images and RPCs.

FIG. 6 illustrates an embodiment of a correlation coefficient map calculated using KOMPSAT-2 stereoscopic images and RPCs, which was generated using the extracted first ground coordinates and the third level pyramid chip determined at the pyramid chip step 53. As can be seen from the drawing, an error $\Delta X$ in an X direction and an error $\Delta Y$ in a Y direction determined from the maximum value location of the correlation coefficient map generated using the extracted first ground coordinates and the third level pyramid chip were −0.5 m and 0.5 m, respectively.

An error $\Delta X$ in the X direction, an error $\Delta Y$ in the Y direction and an altitude error $\Delta Z$ finally determined from the correlation coefficient maps between the first to third level pyramid chips and the extracted first ground coordinates were 13 m, 123 m, and 103 m, respectively.

An error amount correction step 63 is the step of calculating the second ground coordinates by adding the error $\Delta X$ in the X direction, the error $\Delta Y$ in the Y direction and the altitude error $\Delta Z$ extracted at the maximum correlation coefficient location determination step 62 to the first ground coordinates.

An RPC correction model step 70 is the step of correcting the RPC model extracted at the image and auxiliary data extraction step 10 using the second ground coordinates calculated at the second ground coordinate extraction step 60.

The present invention presents an RPC correction model that additionally applies mathematical polynomials to an RPC model that is provided as the auxiliary data of satellite images.

An error amount calculation step 71 is the step of calculating an error $\Delta X_i$ in the X direction and an error $\Delta Y_i$ in the Y direction between the first ground coordinates extracted from the first ground coordinate extraction step 40 and the second ground coordinates extracted from the second ground coordinate extraction step 60.

An error tendency analysis step 72 is the step of analyzing error tendencies in an image column direction and an image line direction with respect to the error $\Delta X_i$ in the X direction and the error $\Delta Y_i$ in the Y direction calculated through the error amount calculation step 71.

Figure 7:
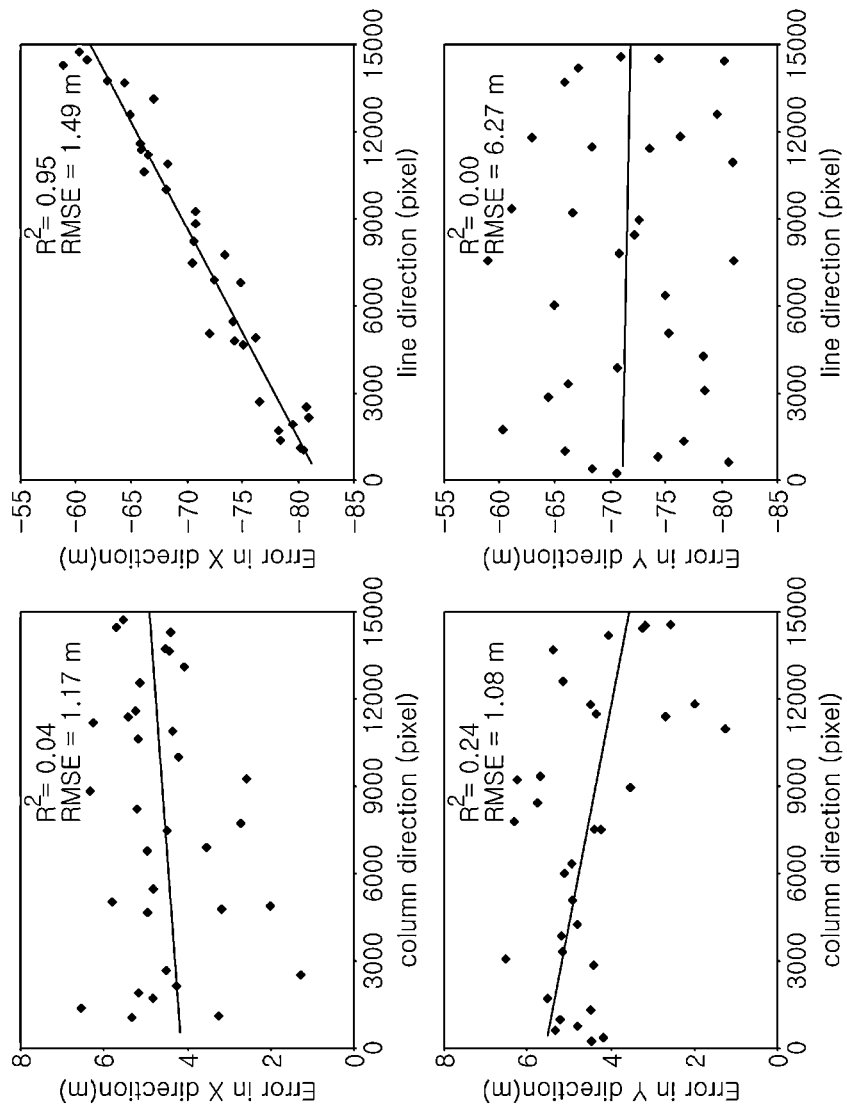
FIG. 7 is a diagram illustrating an example of the distribution of X-direction errors and Y-direction errors in image column and line directions with respect to KOMPSAT-2 stereoscopic images.

FIG. 7 illustrates an example of the distribution of X-direction errors and Y-direction errors in image column and line directions with respect to KOMPSAT-2 images. As illustrated in this drawing, it can be seen that the number of errors in the X direction and the number of errors in the Y direction vary along image column and line directions. The reason for this is that the pixels of the images are based on different observation angles. If this is not corrected, absolute errors are not high, but errors propagate along the X and Y directions.

Figure 8:
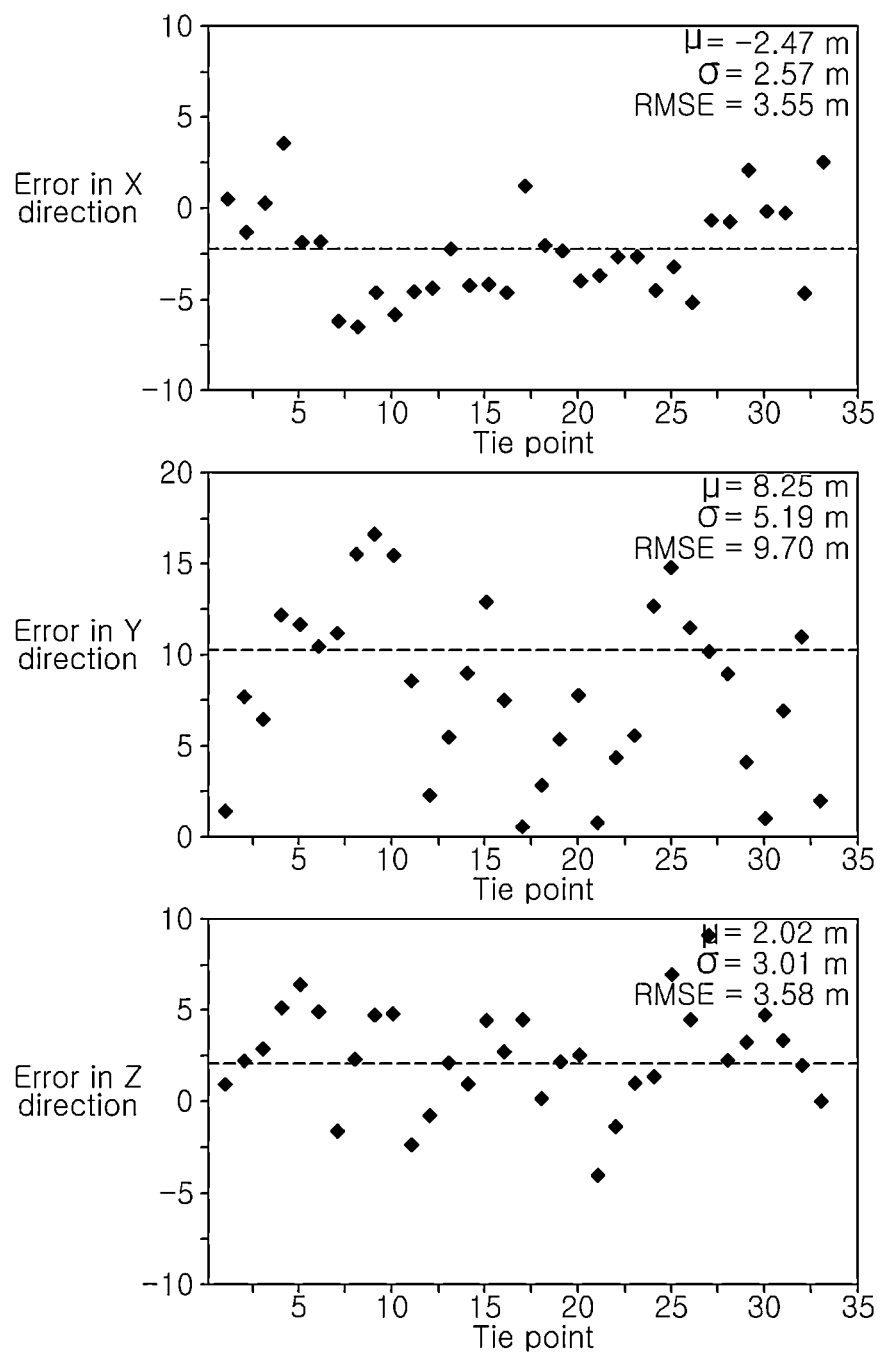
FIG. 8 is a diagram illustrating the differences between the actual ground coordinates of 33 test points and ground coordinates determined using an RPC correction model.

The error correction step 73 of the RPC correction model generation step 70 is the step of correcting the above-described characteristics of the errors. When KOMPSAT-2 stereoscopic images are used as an embodiment of the present invention, an RPC correction model in the form of a first-order polynomial that corrects the X-direction error $\Delta_x$ in the image line direction and the Y-direction error $\Delta_y$ in the image column direction based on the results of FIG. 8 is generated at step 70, and the RPC correction model may be expressed as the following Equation 7:

$$\Delta_x = \Delta_0 l + \beta_0 \Delta_y = \alpha_1 c + \beta_1 \qquad (7)$$

In this equation, $\Delta_x$ and $\Delta_y$ are the errors in the X and Y directions calculated by the RPC model, c and i are the numbers of columns and lines in the images, and $\alpha_0, \alpha_1, \beta_0, \beta_1$ are RPC bias correction coefficients.

The error in the X direction and the error in the Y direction with respect to the tie point, calculated at the error amount calculation step 71, and the actual image coordinates (i,j) of the tie point are substituted in the form of an observation equation, and the coefficients of the RPC bias correction model of Equation 7 are calculated by repeatedly using a least square method.

Equation 7 is characterized in that it is used when KOMPSAT-2 stereoscopic images are used as an embodiment of the present invention.

An RPC correction model acquired through the error tendency analysis step 72 and the error correction step 73 may exhibit different result values according to the characteristics of satellite images used. Extended application to a method of correcting provided RPC data itself and a method of adding a mathematical correction model to an RPC model may be performed using the second ground coordinates extracted through the second ground coordinate extraction step 60 as a ground control point.

Furthermore, in the method of adding a mathematical correction model to a provided RPC model, the RPC correction model generation step 70 may be performed by correcting different types of errors at step 73 according to results acquired through the error tendency analysis step 72 using a translation model, a first-order polynomial model, an affine model or a second-order polynomial model.

The exterior orientation performance step 80 corrects the errors of the RPC model using the second ground coordinates acquired through the second ground coordinate extraction step and the RPC correction model acquired through the RPC correction model generation step 70, thereby performing exterior orientation that allocates accurate ground coordinates to each set of image coordinates.

FIG. 8 is a diagram illustrating the differences between ground coordinates, determined with respect to 33 test points using KOMPSAT-2 stereoscopic images and an RPC correction model, and the original ground coordinates thereof, from which it can be seen that the determined ground coordinates have an error within 10 m (RMSE). This is a very accurate result considering that the spatial resolution of a digital elevation model used is 90 m. The accuracy of the determined ground coordinates varies depending on the spatial resolution and accuracy of a digital elevation model used.

After this step, the images come to have information about ground coordinates. Accordingly, based on this, a 3D image can be generated, an orthoimage can be generated by reconfiguring the locations of pixels, and a digital map, digital elevation data, etc. can be generated.

Meanwhile, a method for automatic geometric correction using RPCs in accordance with an embodiment of the present invention may be implemented in the form of program instructions that are executable by various types of computer means, and may be recorded in a computer-readable storage medium. The computer-readable storage medium may include program instructions, data files, and data structures either separately or in combination. The program instructions stored in the medium may be designed and configured especially for the present invention or may be known to and usable by those skilled in the art of computer software. Examples of the computer-readable storage medium may include a magnetic medium, such as a hard disk, a floppy disk, or magnetic tape, an optical medium, such as CD-ROM or a DVD, a magneto-optical medium, such as a floptical disk, and a hardware apparatus, such as ROM, RAM, or flash memory which is especially configured to store and execute the program instructions.

Examples of the program instructions include not only such machine language code that is created by a compiler, but also such high-level language code that is executable by a computer using an interpreter or the like. The hardware apparatus can be configured to function as one or more software modules so as to perform the operation of the present invention, and vice versa.

The above description is merely an illustrative description of the technical spirit of the present invention, and those having ordinary knowledge in the technical field to which the present invention pertains can make modifications and variations within the range that does not depart from the essential characteristics of the present invention. Accordingly, the disclosed embodiments of the present invention are not intended to limit the technical spirit of the present invention but to illustrate the technical spirit of the present invention, and the scope of the technical spirit of the present invention is not limited to these embodiments. The range of protection of the present invention should be interpreted based on the following claims, and all technical spirit within the range equivalent to the claims should be construed as falling within the range of the rights of the present invention.

INDUSTRIAL APPLICABILITY

The present invention relates to technology for correcting geometric image errors calculated as rational polynomial coefficients (RPCs) only using a tie point extracted from a digital elevation model (DEM) and stereoscopic images without the direct measurement of a ground control point.

For this purpose, a system for automatic geometric correction using RPCs in accordance with the present invention includes an auxiliary data extraction unit, a tie point extraction unit, a first ground coordinates extraction unit, a second ground coordinates extraction unit, an RPC correction model generation unit, and an image distortion correction unit. The auxiliary data extraction unit extracts two or more different images, acquired by photographing a same ground surface, and auxiliary data on the images. The tie point extraction unit extracts a tie point from the two or more different images through image matching. The first ground coordinates extraction unit extracts first ground coordinates from the tie point and the RPC (rational polynomial coefficient) model of the auxiliary data. The second ground coordinates extraction unit extracts second ground coordinates using the first ground coordinates and the correlation coefficients of a digital elevation model. The RPC correction model generation unit generates an RPC correction model by correcting the RPC model based on the second ground coordinates. The image distortion correction unit corrects the distortion of the images by allocating ground coordinates to each set of image coordinates of the images using the second ground coordinates and the RPC correction model.

What is claimed is:

1. A system for automatic geometric correction using rational polynomial coefficients (RPCs), comprising:
a processor configured to:
extract two or more different images, acquired by photographing a same ground surface, and auxiliary data on the images;
extract a tie point from the two or more different images through image matching;
extract first ground coordinates from the tie point and an RPC (rational polynomial coefficient) model of the auxiliary data;
extract second ground coordinates using the first ground coordinates and correlation coefficients of a digital elevation model;
generate an RPC correction model by correcting the RPC model based on the second ground coordinates; and
correct distortion of the images by allocating ground coordinates to each set of image coordinates of the images using the second ground coordinates and the RPC correction model.

2. The system of claim 1, wherein the processor is further configured to:
calculate an error in an X direction and an error in a Y direction between the first ground coordinates and the second ground coordinates;
analyze error tendency of the calculated X- and Y-direction errors in image column and line directions; and
correct the X- and Y-direction errors based on the analysis.

3. The system of claim 1, wherein the processor is further configured to correct the RPC model using the second ground coordinates and the RPC correction model, thereby allocating ground coordinates to each set of image coordinates of the images.

4. A method for automatic geometric correction using rational polynomial coefficients (RPCs), comprising the steps of:
(a) extracting two or more different images, acquired by photographing a same ground surface, and auxiliary data on the images;
(b) extracting a tie point from the two or more different images through image matching;
(c) extracting first ground coordinates from the tie point and an RPC (rational polynomial coefficient) model of the auxiliary data;

(d) extracting second ground coordinates using the first ground coordinates and correlation coefficients of a digital elevation model;
(e) generating an RPC correction model by correcting the RPC model based on the second ground coordinates; and
(f) correcting distortion of the images by allocating ground coordinates to each set of image coordinates of the images using the second ground coordinates and the RPC correction model.

5. The method of claim 4, wherein step (e) comprises:
calculating an error in an X direction and an error in a Y direction between the first ground coordinates and the second ground coordinates;
analyzing error tendency of the calculated X- and Y-direction errors in image column and line directions; and
correcting the X- and Y-direction errors based on the analysis.

6. The method of claim 4, wherein step (f) comprises correcting the RPC model using the second ground coordinates and the RPC correction model, thereby allocating ground coordinates to each set of image coordinates of the images.

7. A non-transitory computer-readable storage medium having stored therein a program configured to perform a method of claim 4.

* * * * *